United States Patent [19]

Akimoto et al.

[11] Patent Number: 5,331,345
[45] Date of Patent: Jul. 19, 1994

[54] TELEVISION CAMERA DEVICE

[75] Inventors: Toshiyuki Akimoto, Tokyo; Tatsuro Yamazaki, Tachikawa, both of Japan

[73] Assignee: Canon Kabushiki Kaisha, Tokyo, Japan

[21] Appl. No.: 900,321

[22] Filed: Jun. 18, 1992

[30] Foreign Application Priority Data

Jun. 21, 1991 [JP] Japan .................. 3-149148
Sep. 6, 1991 [JP] Japan .................. 3-254605
Sep. 6, 1991 [JP] Japan .................. 3-254606

[51] Int. Cl.⁵ ........................... H04N 5/232
[52] U.S. Cl. ................... 348/297; 348/362; 354/412
[58] Field of Search ............ 358/433, 434, 209, 909, 358/906, 228; 434/43, 44; 354/412, 410

[56] References Cited

U.S. PATENT DOCUMENTS

| | | | |
|---|---|---|---|
| 4,463,380 | 7/1984 | Hooks, Jr. | 358/160 |
| 4,645,459 | 2/1987 | Graf et al. | 434/43 |
| 4,805,121 | 2/1989 | Scott et al. | 364/522 |
| 4,835,532 | 5/1989 | Fant | 340/728 |
| 4,853,733 | 8/1989 | Watanabe et al. | 354/412 |
| 4,931,823 | 6/1990 | Nakajima et al. | 354/412 |
| 5,040,016 | 8/1991 | Ishikawa et al. | 354/412 |
| 5,184,169 | 2/1993 | Nishitani | 354/412 |

Primary Examiner—Joseph Mancuso
Assistant Examiner—Wendy R. Greening
Attorney, Agent, or Firm—Fitzpatrick, Cella, Harper & Scinto

[57] ABSTRACT

A television camera device having an image pickup structure, with a plurality of control units, for producing an optimum image output signal that (i) corresponds to a received object image (ii) is in accordance with one of a plurality of predetermined image pickup environments. The device includes a memory for storing scene files which contain image pickup control data for the plurality of the predetermined image pickup environments, and a mode setting structure for selecting a particular scene file from the scene files stored in the memory. Further, the device includes a timer operatable in response to the selection of a scene file by the mode setting structure, and an operation structure, coupled to the image pickup structure, the memory, the mode setting structure, and the timer. The operation structure sequentially outputs to the image pickup structure intermediate image pickup control data which is between the control data of the pre-selection scene file and the control data of the post-selection scene file. The operation structure changes the intermediate control data is discrete increments at a frequency determined by the timer when the scene file is selected by the mode setting structure.

5 Claims, 7 Drawing Sheets

TELEVISION CAMERA DEVICE

BACKGROUND OF THE INVENTION

1. Field of the Invention

The present invention relates to a television camera device for setting a status by a scene file.

2. Description of the Related Art

In a prior art television camera, an operator stores data of a series of adjustment status to photographing environments in a memory as a scene file so that an optimum image output is produced in accordance with a plurality of preset image pickup environments, and where there is no time for adjustment before the image pickup, the scene file is exchanged.

As shown in FIG. 1, in the prior art, a scene file is selected by mode setting means 1, and when a CPU 2 receives a scene file selection request, it reads out the scene file data from a memory 3 and outputs it to image pickup means 5 by a data output means 4 to set an adjustment status of the image pickup means 5.

However, where the image pickup is continuously conducted under two different environments, the adjustment is not well attained by any one of the environment scene files in a transition status between the two environments, and the image is suddenly switched when the scene file is switched. As a result, the resulting image is unnatural.

SUMMARY OF THE INVENTION

It is an object of the present invention to provide a television camera device which reduces a shift of adjustment status in the transition between different environments and eliminates sudden switching of an image when a scene file is switched.

In order to achieve the above object, a television camera device in one embodiment of the present invention comprises image pickup means having a plurality of control units to produce an optimum image output in accordance with an object to be imaged and an environment of image pickup; memory means for scene files storing status data for optimizing the control units for a plurality of anticipated image pickup environments;

mode setting means for selecting a scene file; potentiometer means sliding between a start point and an end point; position detector for detecting a position between the start point and the end point of the potentiometer; operation means for interpolating an intermediate characteristic of the scene file selected by the mode setting means in accordance with the detected position; and output means for outputting the data of the scene file from the operation means to the image pickup means.

The television camera device of the present invention selects the scene file by the mode setting means, stores the intermediate characteristic of the selected scene file in accordance with the position of the potentiometer means by manipulating the potentiometer means, and sets the adjustment status of the image pickup means.

In order to achieve the object of the present invention, a television camera device of another embodiment of the present invention comprises image pickup means having a plurality of control units to produce an optimum image output in accordance with an object to be imaged and an environment of image pickup; memory means for scene files storing status data for optimizing said control units for a plurality of anticipated image pickup environments;

mode setting means for selecting a scene file; timer means operable by the switching of the scene file; and operation means for interpolating intermediate characteristics between the pre-switching scene file and the post-switching scene file when the scene file is switched by the mode setting means, in a plurality of stage at every time period determined by the timer means.

The television camera device of the present embodiment periodically calculates an interpolation value from pre-switching data to post-switching data by the calculation means connected to the timer means when the scene file is switched by the mode setting means and outputs it to the image pickup means through the data output means to adjust the image pickup means.

Other objects and features of the present invention will be apparent from the following description and the accompanying drawings.

DETAILED DESCRIPTION OF THE PREFERRED EMBODIMENTS

One embodiment of the present invention to now explained with reference to FIGS. 2 and 3.

Figure 1:
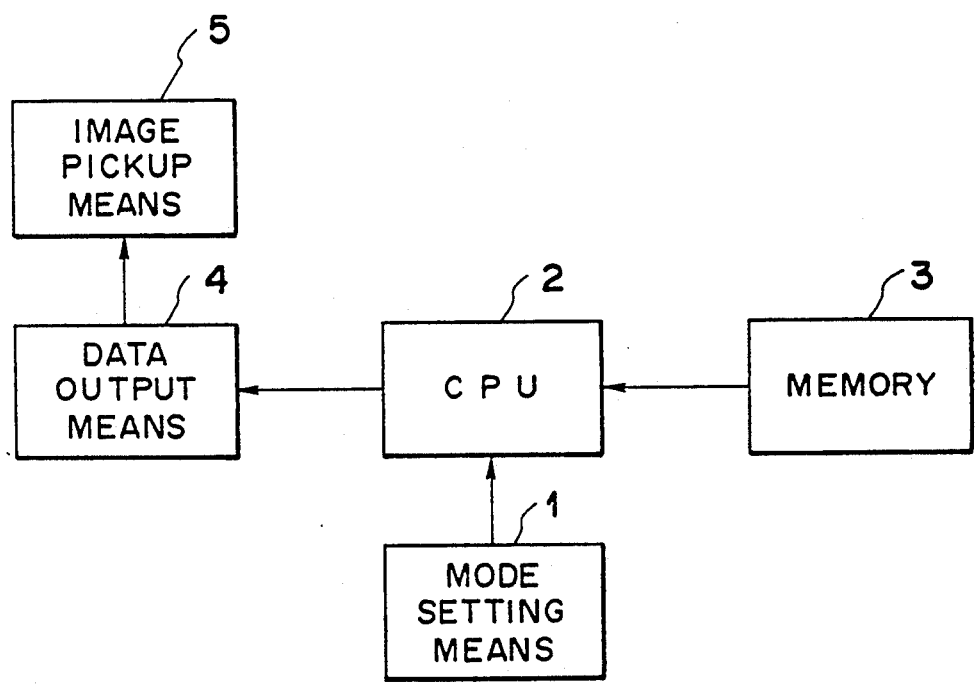
FIG. 1 shows a prior art configuration.
Figure 2:
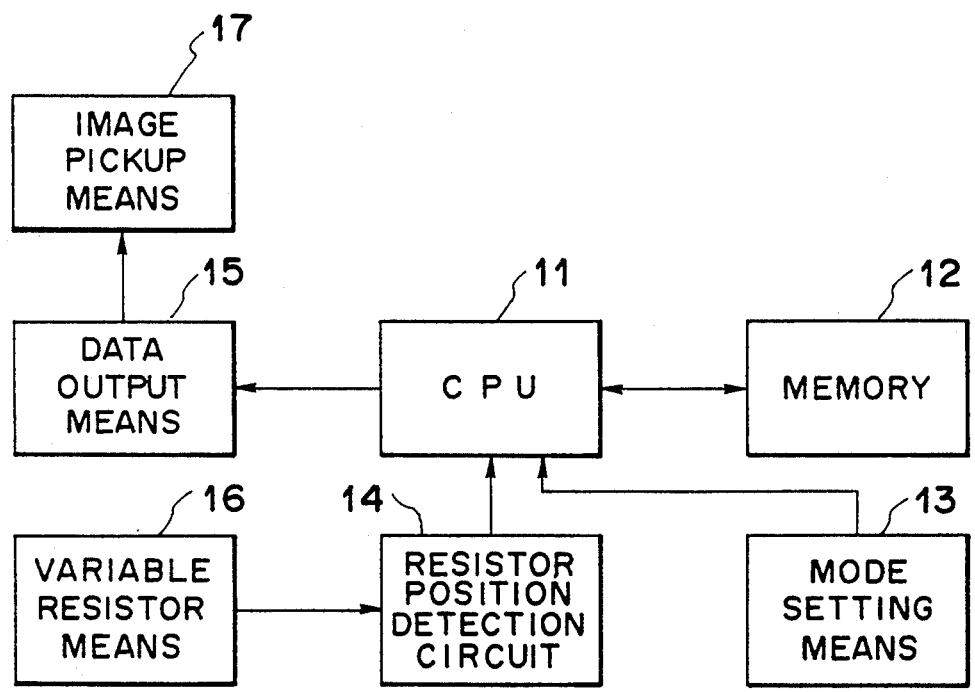
FIG. 2 shows a principle configuration.

FIG. 2 shows a principle configuration, a CPU 11 at a center is connected to a memory 12, mode setting means 13, potentiometer (resistor) position detection means 14 and data output means 15. An output of potentiometer (variable resistor) means 16 is connected to the potentiometer position detection means 14 and an output of the data output means is connected to image pickup means 17.

Figure 3:
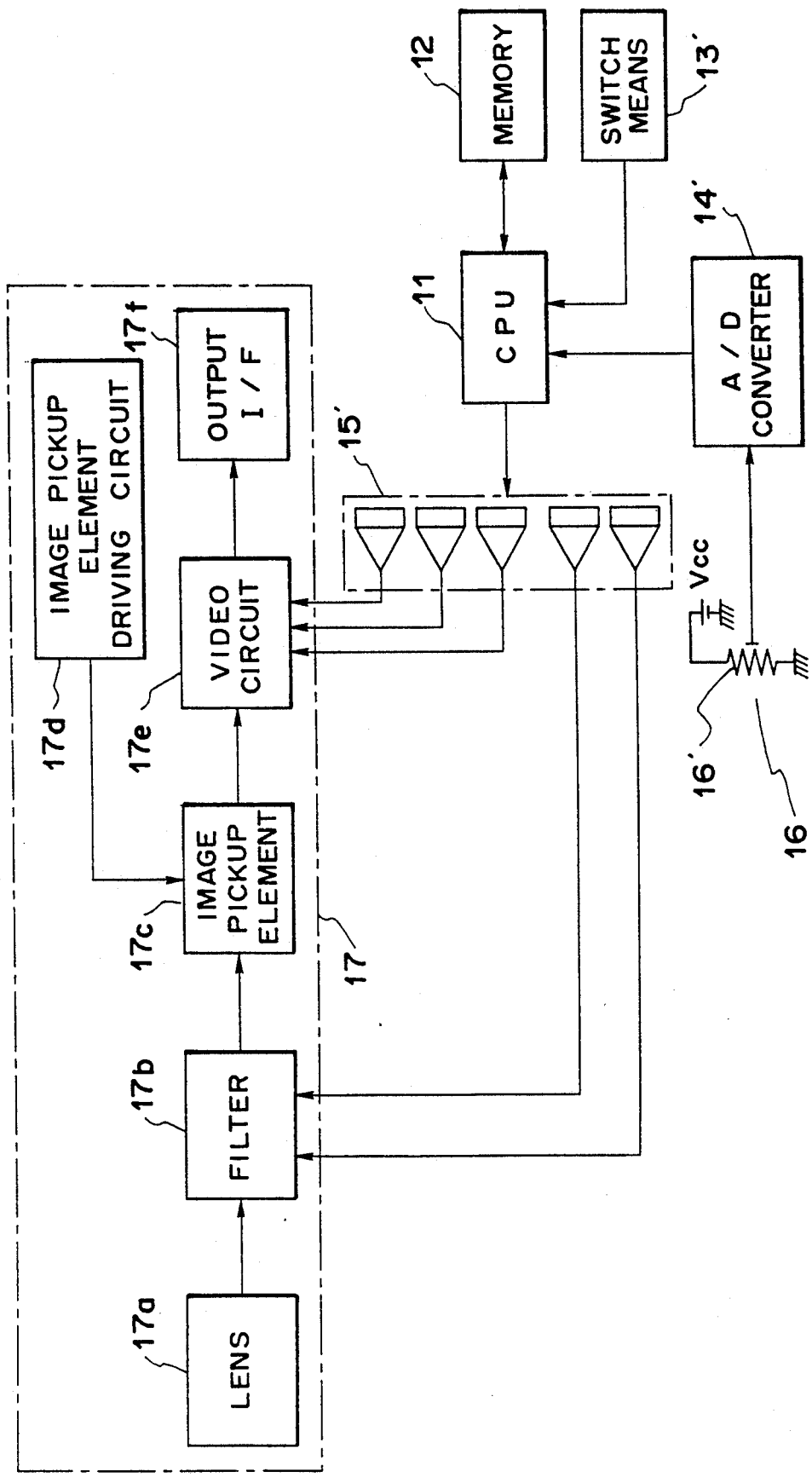
FIG. 3 shows a specific configuration of an embodiment.

FIG. 3 shows a specific configuration of the embodiment. Switching means 13' is used as the mode setting means 13, an A/D converter 14' is used as the potentiometer position detection means 14, and a D/A converter 15' is used as the data output means 15. The potentiometer means 16 comprises a potentiometer 16' having a voltage $V_{CC}$ applied thereto, and the image pickup means 17 comprises a lens 17a, a filter 17b which may be selected from several CC filters and ND filters, an image pickup device 17c such as a CCD, an image pickup device driver 17d, a video circuit 17e for controlling gamma and AGC gains, pedestal level and white balance, and an output interface 17f. An output of the D/A converter 15' is connected to the filter 17b and the video circuit 17e. Data of the D/A converter 15' which optimizes the filter 17b and the video circuit 17e for the image pickup under an anticipated environment is stored as a scene file for each anticipated environment.

The output voltage from the potentiometer 16' is converted to digital data by the A/D converter 14' and it is sent to the CPU 11 as the potentiometer position data. Scene files for the start position and the end position of the potentiometer 16' are selected by the switching means 13' and the CPU 11 calculates an interpolation value of the two scene file data of the start point and the end point the potentiometer 16' in accordance with the potentiometer position, and supplies it to the D/A converter 15', which converts it to analog data to control the filter 17b and the video circuit 17e.

Assuming that the scene file data at the start position of the potentiometer 16' is A, the scene file data at the end position of the potentiometer 16' is B, the CPU 11 calculates data $A+k\times(B-A)$ for a potentiometer position k ($0 \leq k = 1$) where the start position of the potentiometer is represented by 0 and the end position is represented by 1, and sends it to the D/A converter 15'. As a result, an intermediate control status between the two extreme control statuses is linearly interpolated in accordance with the potentiometer position.

Instead of the linear interpolation, non-linear interpolation may be used, and any intermediate control status between the two scene file data can be reproduced in accordance with the potentiometer position.

In accordance with the television camera device of the present invention, when images are to be picked up continuously under a plurality of different environments, the potentiometer is slid with the movement of the camera so that the intermediate scene file data is continuously outputted for the changing environment and the camera condition is adjusted. Accordingly, the deviation of the control status of the camera during the movement of the camera under different environments is reduced, and unnatural image caused by the abrupt change of the control status when the scene file is switched is also eliminated.

Another embodiment of the present invention is now explained with reference to FIGS. 4 and 5.

Figure 4:
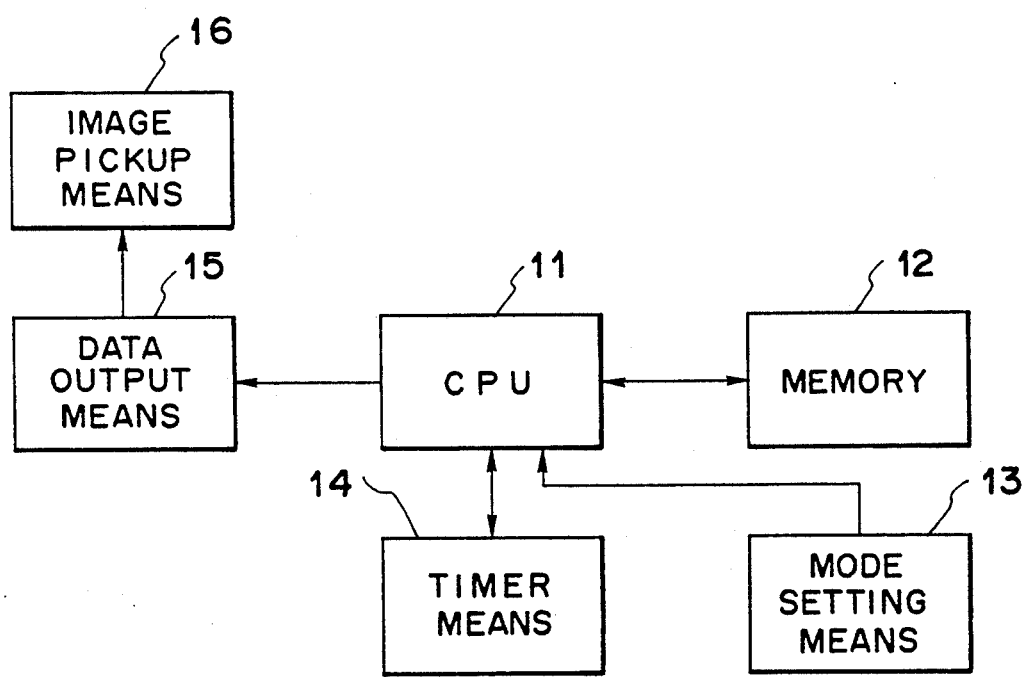
FIG. 4 shows a principle configuration of another embodiment.

FIG. 4 shows a principle configuration. A CPU 11 at a center position is connected to a memory 12, mode setting means 13, a timer 14, and data output means 15. The data output means 15 is connected to image pickup means 16.

Figure 5:
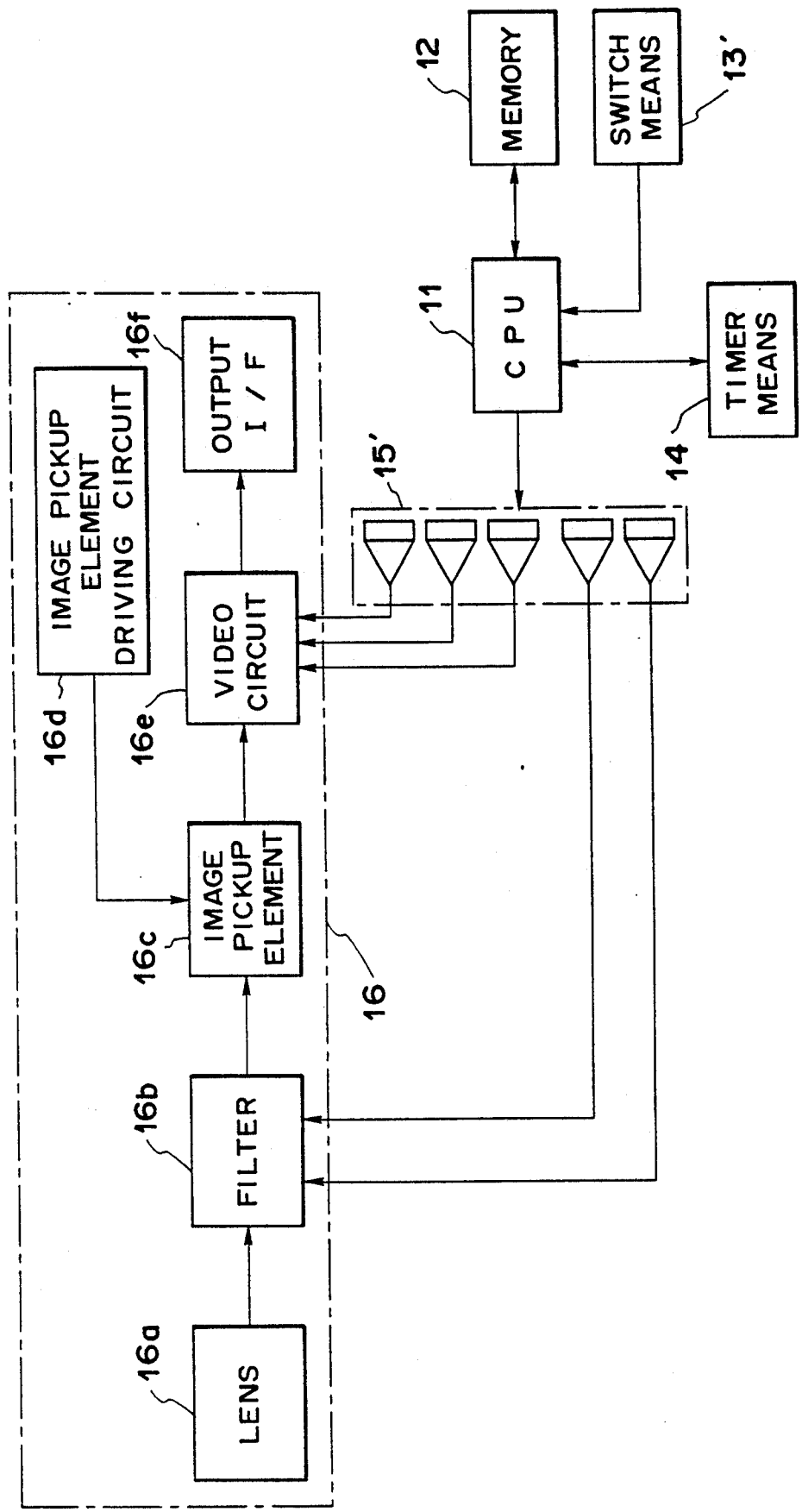
FIG. 5 shows a specific configuration of the other embodiment.

FIG. 5 shows a specific configuration of the present embodiment. Switching means 13' is used as the mode setting means 13 and a D/A converter 15' is used as the data output means 15. The image pickup means 16 comprises a lens 16a, a filter 16b which may be selected from several CC filters and ND filters, an image pickup device 16c, an image pickup device driver 16d, a video circuit 16e for controlling gamma, gain and pedestal, and an output interface 16f. An output of the D/A converter 15' is connected to the filter 16b and the video circuit 16e. Data of the D/A converter 15' which optimizes the filter 16b and the video circuit 16e for the image pickup under an anticipated environment is stored in the memory 12 as a scene file for each anticipated environment.

The switching means 13' serves to supply selected information of the scene file to the CPU 11. When the scene file is switched by the switching means 13', the CPU 11 conducts the interpolation N times by using the timer 14 and sends N stages of data between the pre-switching scene file data and the post-switching scene file data to the D/A converter 15'. Assuming that the pre-switching scene file data is A and the post-switching scene file data is B and the data is interpolated at every predetermined period t, the timer 14 counts the predetermined period t under the control of the CPU 11 and sends a signal to the CPU at every time period t.

When the CPU 11 receives the signal from the timer 14, it calculates data $A+(B-A)/N\times k$ and sends it to the D/A converter 15', where k is the number of signals generated by the timer 14 and it is a natural number between 1 and N. The D/A converter 15' converts the data from the CPU 11 to analog data to control the filter 16b and the video circuit 16e. When k=N, the switching is terminated. In this manner, the scene file is switched while the scene file data is linearly interpolated in N stages during $t\times N$ period.

While the linear interpolation is shown above, non-linear interpolation may be used depending on a characteristic which the D/A converter 15' controls.

In accordance with the television camera device of the present embodiment, the interpolation data is outputted periodically by the provision of the timer means when the scene file is switched so that the control status of the camera is smoothly changed. Accordingly, an unnatural image which is caused by the abrupt change of the control status when the scene file is switched is eliminated.

Another embodiment of the present invention is now explained with reference to FIGS. 6 and 7.

Figure 6:
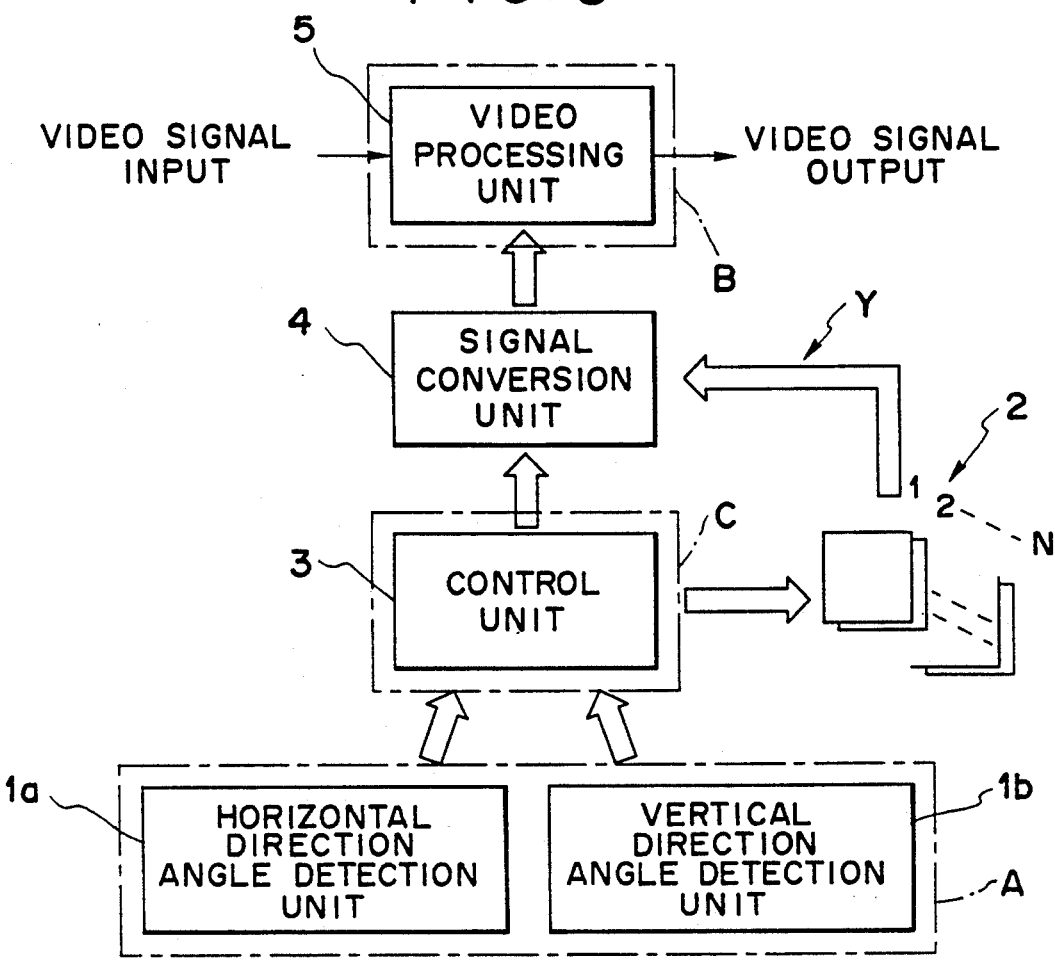
FIG. 6 shows a configuration of a further embodiment of the television camera device of the present invention.
Figure 7:
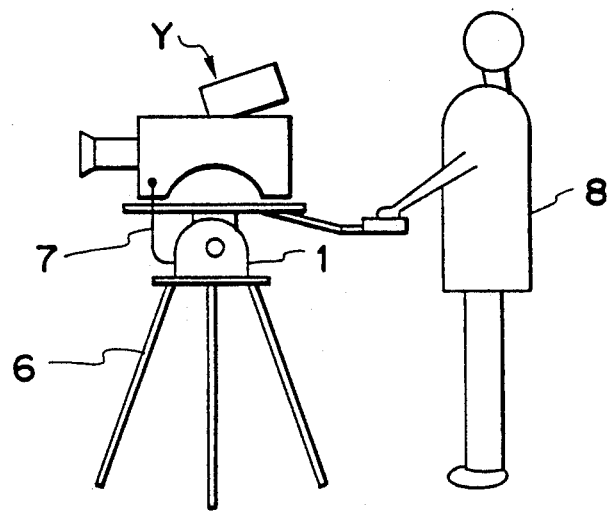
FIG. 7 shows an operation status of the further embodiment.

FIG. 6 shows a configuration of the television camera device in the present embodiment, and FIG. 7 illustrates an operation status thereof.

In FIG. 6, Y denotes a television camera device, and A denotes angle detection means which comprises a horizontal angle detector 1a and a vertical angle detector 1b which detect a horizontal angle and a vertical angle, respectively. B denotes video signal processing means which comprises a video processor 5 for processing a video signal in accordance with the angle signals detected by the angle detection means A.

C denotes video signal control means which automatically controls the video signal processing means.

Details of those means will be described later.

In FIG. 6, numeral 2 denotes a memory for storing a correction amount at an image pickup angle in accordance with the angle signals detected by the angle detectors 1a and 1b. A control unit 3 writes and reads the correction amount (to be described later) at the image pickup angle to and from the memory 2. Numeral 4 denotes a signal converter which interpolates the correction amount read by the control unit 3 in accordance with the image pickup angle and generates a control signal to the video processor 5 which functions as the video signal processing means B.

In FIG. 7, numeral 6 denotes a table for fixing the television camera device Y, numeral 7 denotes a transmission line for transmitting the angle signal which is the output of the angle detector 1, and numeral 8 denotes an operator for the television camera device Y.

An operation of the present embodiment is now explained with reference to FIGS. 6 and 7.

In FIG. 6, the television camera device Y is first arranged and then correction amounts (to be described later) at image pickup angles 1 to N are stored in memory 2. It is assumed that the television camera device Y is now at the image pickup angle 1. The correction angle at the image pickup angle 1 is read from the memory 2 and it is converted by the signal converter 4 to a control signal by which the video signal is processed in the video processor 5.

Assuming that the operator 8 thereafter rotates the television camera Y from the image pick-up angle 1 to the image pickup angle 2, the horizontal and vertical angle detectors detect the current image pickup angles and the angle signal is sent to the control unit 3 through the transmission line 7. The control unit 3 reads out the two correction amounts for the image pickup angle 1 and the image pickup angle 2 from the memory 2.

The signal converter 4 interpolates the correction amount between the two correction amounts based on the image pickup angle. The interpolated correction amount is converted to a control signal and the video signal is processed by the video processor 5.

A γ-correction in the processing of the video signal is explained below.

Assuming that the angle signals at the image pickup angle 1 and the image pickup angle 2 are $\theta_1$ and $\theta_2$ and γ-corrections therefor are Y1 and Y2, respectively, a γ-correction γ for the image pickup angle $\theta$ ($\theta_1 < \theta < \theta_2$) is represented by $$\gamma = \frac{\gamma_2 - \gamma_1}{\theta_2 - \theta_1} (\theta - \theta_1) + \gamma_1$$

Figure 8:
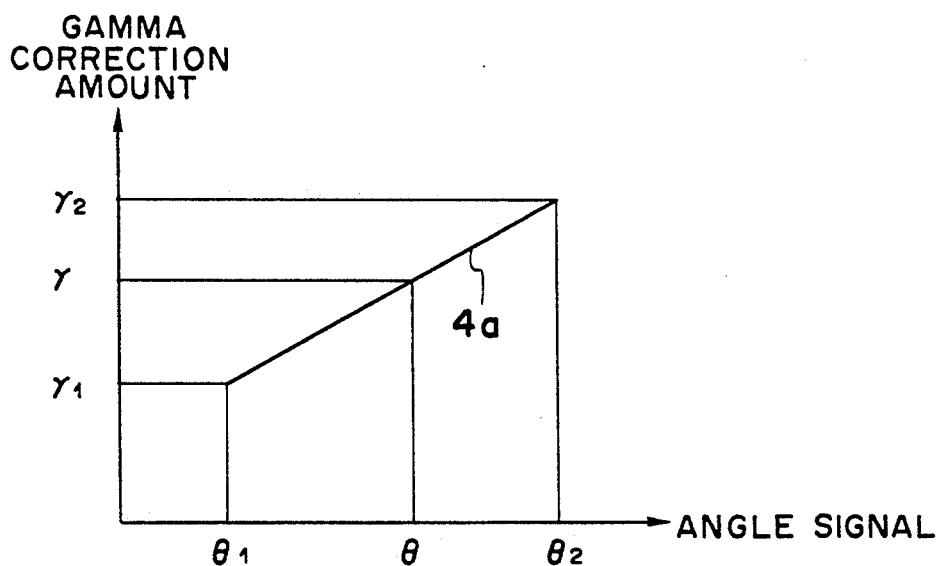
FIG. 8 shows interpolation of gamma correction in the further embodiment.

The correction amount is shown in FIG. 8 in which an abscissa represents the angle signal and an ordinate represents the γ correction amount.

Similar corrections are conducted for white level, black level, outline correction, amplifier gain and two-one correction of the television camera Y. Those are automatically corrected by the angle signals as the γ correction is.

A further embodiment of the present invention is explained with reference to FIG. 9.

Figure 9:
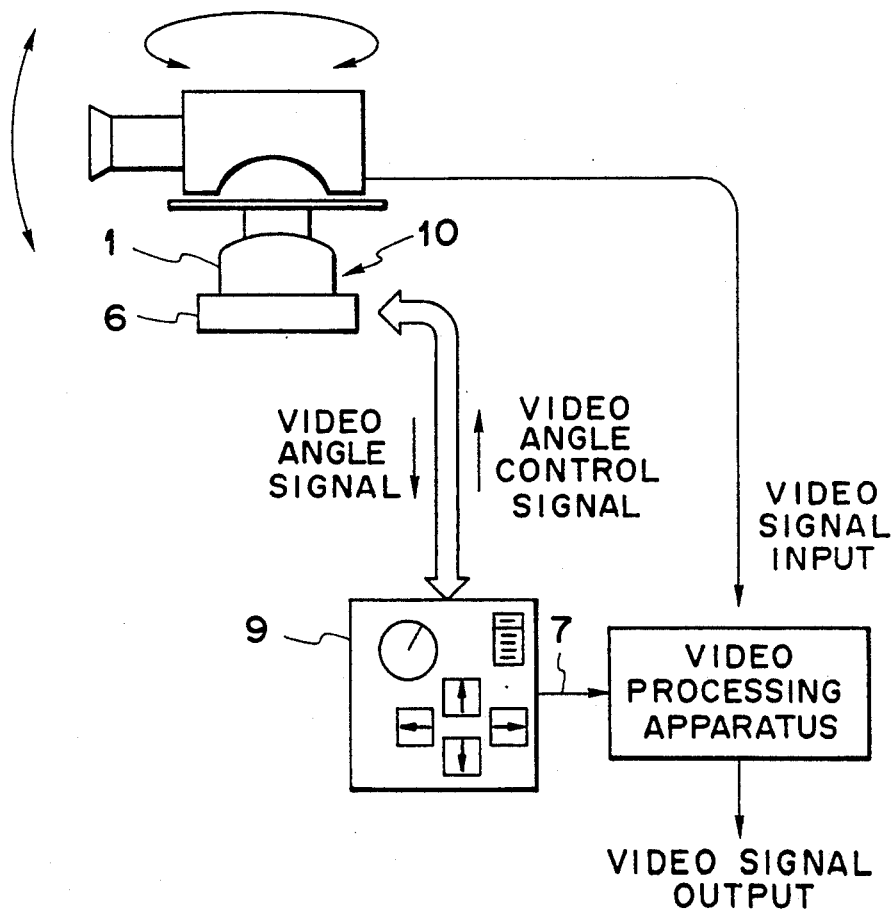
FIG. 9 shows a configuration of another embodiment of the television camera device.

FIG. 9 shows a configuration of the television camera device of the present embodiment.

The present embodiment differs from the previous embodiment in that it can remotely control the image pickup angle of the television camera which is located without an attendant.

In FIG. 9, numeral 9 denotes a console unit for displaying the image pickup angle and numeral 10 denotes a turn table for rotating the television camera in response to an image pickup angle control signal from the console unit 9. Other elements are identical to that of the previous embodiment and duplicate explanation is omitted.

An operation of the present embodiment is explained with reference to FIG. 9.

In FIG. 9, the console unit 9 controls the turn table 10 by the image pickup angle to rotate the television camera. The image pickup angle is detected by the angle detector 1 and it is displayed on the console unit 9. The image pickup angle is supplied to the video processor (FIG. 6) through the transmission line 7 so that the image processing which conforms to the current image pickup angle is automatically conducted as it is in the previous embodiment.

In accordance with the present invention, the video processing means is automatically controlled by the image pickup angle so that the real-time control which could not be done in the prior art is attained. Therefore, a burden to the operator is reduced and only one television camera is needed instead of a plurality of television cameras required in the prior art.

Thus, more advantages in the present image pickup apparatus, not available in the prior art, are attainable with a simpler system configuration.

What is claimed is:

1. A television camera device comprising:
   image pickup means, having a plurality of control units, for producing an optimum image output signal (i) corresponding to a received object image and (ii) in accordance with one of a plurality of predetermined image pickup environments;
   memory means for storing scene files which contain image pickup control data for said plurality of predetermined image pickup environments;
   mode setting means for selecting a particular scene file from the scene files stored in said memory;
   timer means operable in response to the selection of the scene file by said mode setting means; and
   operation means, coupled to said image pickup means, said memory means, said mode setting means, and said timer means, for sequentially outputting to said image pickup means intermediate image pickup control data which is between the control data of the pre-selection scene file and the control data of the post-selection scene file, by changing said intermediate control data in discrete increments at a frequency determined by said timer means when the scene file is selected by said mode setting means.

2. A television camera device according to claim 1 wherein said image pickup means includes a CCD.

3. A television camera device comprising:
   image pickup means, having a plurality of control units, for producing an optimum image output signal (i) corresponding to a received object image and (ii) in accordance with one of a plurality of predetermined image pickup environments;
   memory means for storing scene files which contain image pickup control data for said plurality of predetermined image pickup environments;
   mode setting means for selecting a particular scene file from the scene files stored in said memory;
   variable input means for providing a start point corresponding to the control data of the pre-selection scene file and an end point corresponding to the control data of the post-selection scene file;
   position detection means for detecting a position of said variable input means between said start point and said end point;
   operation means, coupled to said image pickup means, said memory means, said mode setting means, said variable input means, and said position detection means for sequentially outputting to said image pickup means intermediate image pickup control data which is between the start point and the end point of the pre-selection and post-selection scene files selected by said mode setting means in accordance with said detected position; and
   output means for sequentially outputting the intermediate image pickup control data between the particular pre-selection and post-selection scene files from said operation means to said image pickup means.

4. A television camera device according to claim 3 wherein said image pickup means includes a CCD.

5. A television camera device according to claim 3, wherein said variable input means includes (i) potentiometer means capable of sliding from the start point to the end point and (ii) potentiometer position detecting means for detecting the position of said potentiometer means.

* * * * *

UNITED STATES PATENT AND TRADEMARK OFFICE
CERTIFICATE OF CORRECTION

PATENT NO. : 5,331,345
DATED : July 19, 1994
INVENTOR(S) : TOSHIYUKI AKIMOTO, ET AL.

It is certified that error appears in the above-indentified patent and that said Letters Patent is hereby corrected as shown below:

On title page, item

[57] ABSTRACT

Line 4, "image (ii)" should read --image and (ii)--.
Line 20, "is" should read --in--.

COLUMN 1

Line 10, "status" should read --statuses--.

COLUMN 2

Line 7, "stage" should read --stages--.
Line 42, "to" should read --is--.
Line 44, "configuration, a" should read --configuration.  A--.

COLUMN 3

Line 10, "end point the" should read --end point of the--.
Line 18, "k ($0 \leq k=1$)" should read --k ($0 \leq k \leq 1$)--.

COLUMN 4

Line 21, "putted" should read --put--.

UNITED STATES PATENT AND TRADEMARK OFFICE
CERTIFICATE OF CORRECTION

PATENT NO. : 5,331,345
DATED : July 19, 1994
INVENTOR(S) : TOSHIYUKI AKIMOTO, ET AL.

It is certified that error appears in the above-indentified patent and that said Letters Patent is hereby corrected as shown below:

COLUMN 5

Line 4, "pick-up" should read --pickup--.
Line 45, "turn table" should read --turntable--.
Line 53, "turn table 10" should read --turntable 10--.

COLUMN 6

Line 1, "more" should be deleted.
Line 15, "memory;" should read --memory means;--.

Signed and Sealed this

Tenth Day of January, 1995

Attest:

BRUCE LEHMAN

Attesting Officer

Commissioner of Patents and Trademarks